(12) United States Patent
Luo

(10) Patent No.: US 7,483,866 B2
(45) Date of Patent: Jan. 27, 2009

(54) SUBCLASS PARTITIONING IN A PATTERN RECOGNITION CLASSIFIER FOR CONTROLLING DEPLOYMENT OF AN OCCUPANT RESTRAINT SYSTEM

(75) Inventor: Yun Luo, Livonia, MI (US)

(73) Assignee: TRW Automotive U.S. LLC, Livonia, MI (US)

(*) Notice: Subject to any disclaimer, the term of this patent is extended or adjusted under 35 U.S.C. 154(b) by 405 days.

(21) Appl. No.: 11/305,935

(22) Filed: Dec. 19, 2005

(65) Prior Publication Data
US 2007/0168941 A1    Jul. 19, 2007

(51) Int. Cl.
G06E 1/00    (2006.01)

(52) U.S. Cl. ............... 706/20; 340/667; 348/148; 382/159; 382/226

(58) Field of Classification Search ............... 706/20; 340/666, 667; 348/148; 382/159, 225, 226
See application file for complete search history.

(56) References Cited

U.S. PATENT DOCUMENTS

| | | | |
|---|---|---|---|
| 5,329,596 A * | 7/1994 | Sakou et al. ............... 382/226 |
| 5,330,226 A | 7/1994 | Gentry et al. |
| 5,590,218 A | 12/1996 | Ornstein |
| 5,889,523 A * | 3/1999 | Wilcox et al. ............... 715/854 |
| 6,457,051 B1 | 9/2002 | Riddle et al. |
| 6,526,168 B1 | 2/2003 | Ornes et al. |
| 6,609,054 B2 * | 8/2003 | Wallace ............... 701/45 |
| 6,625,585 B1 | 9/2003 | MacCuish et al. |
| 6,741,976 B1 | 5/2004 | Tuzhilin |
| 6,801,662 B1 | 10/2004 | Owechko et al. |
| 6,892,193 B2 | 5/2005 | Bolle et al. |
| 6,904,423 B1 | 6/2005 | Nicolaou et al. |
| 7,034,670 B2 * | 4/2006 | Kennedy et al. ............... 340/438 |
| 7,333,023 B2 * | 2/2008 | Murad et al. ............... 340/667 |
| 2002/0059202 A1 | 5/2002 | Hadzikadic et al. |
| 2004/0042665 A1 | 3/2004 | Il et al. |
| 2005/0149284 A1 * | 7/2005 | Nathan et al. ............... 702/101 |
| 2005/0185845 A1 * | 8/2005 | Luo et al. ............... 382/224 |
| 2006/0050953 A1 * | 3/2006 | Farmer et al. ............... 382/159 |

OTHER PUBLICATIONS

"Hierarchical Clustering Schemes", Stephen C. Johnson, Psychometrika, vol. 32, No. 3, Sep. 1967, pp. 241-254.*

(Continued)

*Primary Examiner*—Mai T Tran
(74) *Attorney, Agent, or Firm*—Tarolli, Sundheim, Covell & Tummino LLP

(57) ABSTRACT

Systems and methods are provided for constructing a classification architecture for a pattern recognition classifier that determines an associated occupant class of an occupant within a vehicle. A plurality of occupant classes are defined, with at least one of the occupant classes having an associated set of subclasses (202). A hierarchy of subclass partitions is determined based on a degree of similarity between subclasses associated with a given occupant class (210). Each successive partition in the hierarchy is an immediate partition of the preceding partition. The following is then performed iteratively until a termination event occurs. A subclass partition is selected according to the determined hierarchy (216/230). The fitness of a classifier model having an architecture derived from the selected subclass partition is evaluated (220). A class separation associated with the selected subclass partition is retained when the evaluated fitness is better than that of the preceding subclass partition in the hierarchy (224).

19 Claims, 5 Drawing Sheets

OTHER PUBLICATIONS

"Occupant classification system for automotive airbag suppression", M. E. Farmer, A. K. Jain, Computer Vision & Pattern Recognition, 2003, vol. 1, pp. I-756-I761, Jun. 18-20, 2003.*

"Min and Max Hierarchical Clustering using asymmetric similarity measures", Lawrence Hubert, Psychometrika, vol. 38, No. 1, Mar. 1973, pp. 63-72.*

* cited by examiner

SUBCLASS PARTITIONING IN A PATTERN RECOGNITION CLASSIFIER FOR CONTROLLING DEPLOYMENT OF AN OCCUPANT RESTRAINT SYSTEM

TECHNICAL FIELD

The present invention is directed generally to the use of pattern recognition classifiers as part of a vehicle occupant protection system and is particularly directed to a method and apparatus for establishing a classification architecture for a pattern recognition classifier in a vehicle occupant protection system.

BACKGROUND OF THE INVENTION

Actuatable occupant restraining systems having an inflatable air bag in vehicles are known in the art. Such systems that are controlled in response to whether the seat is occupied, an object on the seat is animate or inanimate, a rearward facing child seat present on the seat, and/or in response to the occupant's position, weight, size, etc., are referred to as smart restraining systems. One example of a smart actuatable restraining system is disclosed in U.S. Pat. No. 5,330,226.

Pattern recognition systems include systems capable of distinguishing among classes of real world stimuli according to a plurality of distinguishing characteristics, or features, associated with the classes. A number of pattern recognition systems are known in the art, including various neural network classifiers, support vector machines, and Bayesian classification models. Training and configuring classifiers is often a time consuming and difficult process. Even once a plurality of features have been found that distinguish among a plurality of classes of interest for a classifier, it is necessary to determine a hypothesis function that separates the classes in a feature space defined by the features. This determination can be complicated when one or more of the plurality of classes cannot be concisely represented within the feature space.

SUMMARY OF THE INVENTION

In accordance with an example embodiment of the present invention, a method is provided for constructing a classification architecture for a pattern recognition classifier that determines an associated occupant class of an occupant within a vehicle. A plurality of occupant classes are defined, with at least one of the occupant classes having an associated set of subclasses. A hierarchy of subclass partitions is determined based on a degree of similarity between subclasses associated with a given occupant class. Each successive partition in the hierarchy is an immediate partition of the preceding partition. The following is then performed iteratively until a termination event occurs. A subclass partition is selected according to the determined hierarchy. The fitness of a classifier model having an architecture derived from the selected subclass partition is evaluated. A class separation associated with the selected subclass partition is retained when the evaluated fitness is better than that of the preceding subclass partition in the hierarchy.

In accordance with yet another example embodiment of the present invention, a computer program product, operative in a data processing system and recorded on a computer readable medium, is provided for establishing a classification architecture, comprising a plurality of operative classes. A partition search component determines a hierarchy of subclass partitions, based on a degree of similarity between subclasses associated with the plurality of occupant classes. A system control iteratively selects a subclass partition according to the determined hierarchy, evaluates the fitness of a pattern recognition classifier having an architecture derived from the selected subclass partition, and retains a class separation associated with the selected subclass partition when the evaluated fitness is better than that associated with a preceding subclass partition in the hierarchy.

In accordance with another example embodiment of the present invention, a system is provided for establishing a classification architecture, comprising a plurality of operative classes, for a pattern recognition classifier operative to distinguish among a plurality of occupant classes as part of a vehicle occupant protection system. A partition search component determines a hierarchy of subclass partitions, based on a degree of similarity between subclasses associated with a given occupant class. A system control iteratively selects a subclass partition according to the determined hierarchy, evaluates the fitness of a pattern recognition classifier having an architecture derived from the selected subclass partition, and retains a class separation associated with the selected subclass partition when the evaluated fitness is better than that associated with a preceding subclass partition in the hierarchy.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF PREFERRED EMBODIMENT

Figure 1:
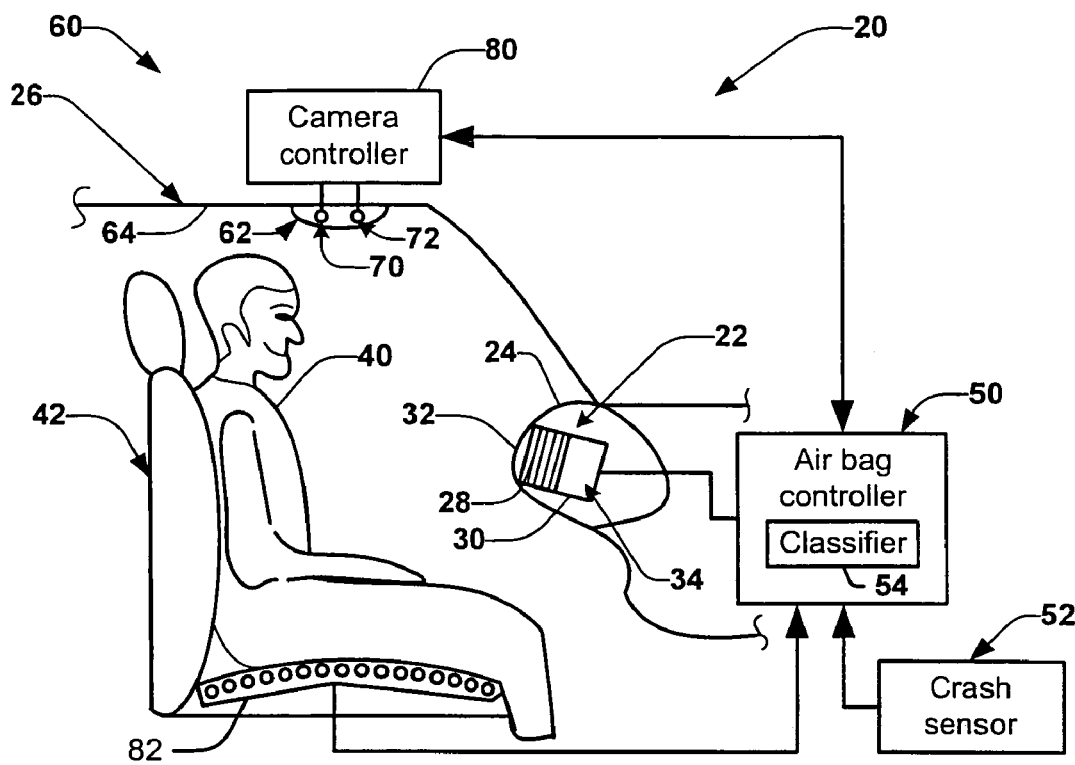
FIG. 1 is a schematic illustration of an actuatable restraining system in accordance with an example embodiment of the present invention.

Referring to FIG. 1, an example embodiment of an actuatable occupant restraint system 20, in accordance with the present invention, includes an air bag assembly 22 mounted in an opening of a dashboard or instrument panel 24 of a vehicle 26. The air bag assembly 22 includes an air bag 28 folded and stored within the interior of an air bag housing 30. A cover 32 covers the stored air bag and is adapted to open easily upon inflation of the air bag 28.

The air bag assembly 22 further includes a gas control portion 34 that is operatively coupled to the air bag 28. The gas control portion 34 may include a plurality of gas sources (not shown) and vent valves (not shown) for, when individually controlled, controlling the air bag inflation, e.g., timing, gas flow, bag profile as a function of time, gas pressure, etc. Once inflated, the air bag 28 may help protect an occupant 40, such as a vehicle passenger, sitting on a vehicle seat 42. Although the example embodiment of FIG. 1 is described with regard to a vehicle passenger seat, the present invention is applicable to a vehicle driver seat and back seats and their associated actuatable restraining systems. The present invention is also applicable to the control of side actuatable restraining devices and to actuatable devices deployable in response to rollover events.

An air bag controller 50 is operatively connected to the air bag assembly 22 to control the gas control portion 34 and, in turn, inflation of the air bag 28. The air bag controller 50 can take any of several forms such as a microcomputer, discrete circuitry, an application-specific-integrated-circuit ("ASIC"), etc. The controller 50 is further connected to a vehicle crash sensor 52, such as one or more vehicle crash accelerometers. The controller monitors the output signal(s) from the crash sensor 52 and, in accordance with an air bag control algorithm using a deployment control algorithm, determines if a deployment event is occurring, i.e., one for which it may be desirable to deploy the air bag 28. There are several known deployment control algorithms responsive to deployment event signal(s) that may be used as part of the present invention. Once the controller 50 determines that a deployment event is occurring using a selected crash analysis algorithm, for example, and if certain other occupant characteristic conditions are satisfied, the controller 50 controls inflation of the air bag 28 using the gas control portion 34, e.g., timing, gas flow rate, gas pressure, bag profile as a function of time, etc.

The air bag control algorithm associated with the controller 50 can be made sensitive to determined characteristics of the vehicle occupant 40. For example, if the determined characteristics indicate that the occupant 40 is an object, such as a shopping bag, and not a human being, actuating the air bag during a crash event serves no purpose. Accordingly, the air bag controller 50 can include a pattern recognition classifier assembly 54 operative to distinguish between a plurality of occupant classes based on the determined characteristics, and a selected occupant class can then, in turn, be used to control the air bag. It will be appreciated that the classifier 54 can be implemented as an independent module that communicates with air bag controller 50 or, alternatively, be integrated into the air bag controller 50.

Accordingly, the air bag restraining system 20, in accordance with the present invention, further includes an array of weight sensors 82 that indicates the distribution of weight on the vehicle seat 42 or/and a stereo-vision assembly 60. The weight sensors can be distributed across the surface of the seat as to provide a two-dimensional representation of the pressure applied on the seat by the presence of the occupant. The output of each sensor in the array 82 can be provided to the air bag controller 50 and used as inputs to the pattern recognition classifier 54.

The stereo-vision assembly 60 can include stereo-cameras 62 preferably mounted to the headliner 64 of the vehicle 26. The stereo-vision assembly 60 includes a first camera 70 and a second camera 72, both connected to a camera controller 80. In accordance with one exemplary embodiment of the present invention, the cameras 70, 72 are spaced apart by approximately 35 millimeters ("mm"), although other spacing can be used. The cameras 70, 72 are positioned in parallel with the front-to-rear axis of the vehicle, although other orientations are possible.

The camera controller 80 can take any of several forms such as a microcomputer, discrete circuitry, ASIC, etc. The camera controller 80 is connected to the air bag controller 50 and provides a signal to the air bag controller 50 to provide data relating to various image characteristics of the occupant seating area, which can range from an empty seat, an object on the seat, a human occupant, etc. Herein, image data of the seating area is generally referred to as occupant data, which includes all animate and inanimate objects that might occupy the occupant seating area. It will be appreciated that the classifier 54 can utilize other inputs besides the array of weight sensors 82 and the camera controller 80.

Figure 2:
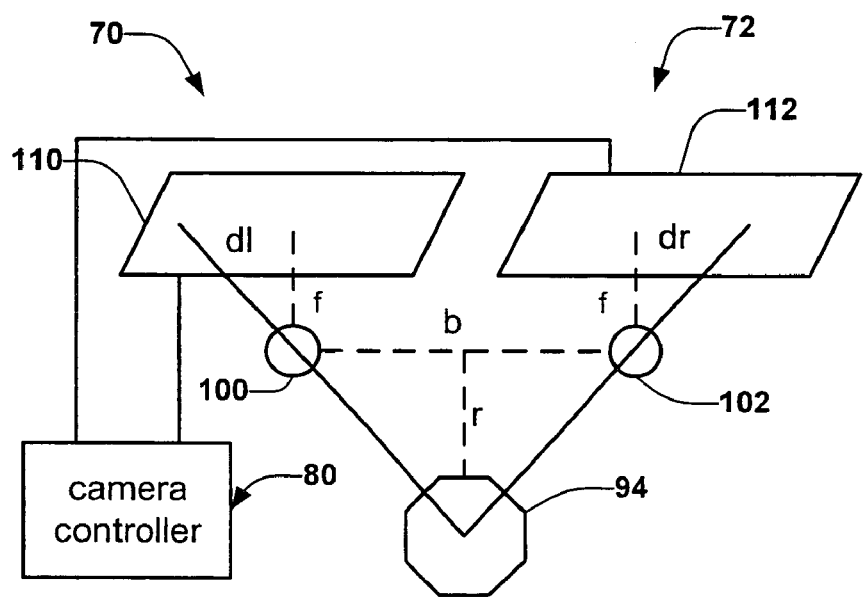
FIG. 2 is a schematic illustration of a stereo camera arrangement for use with the present invention.

FIG. 2 is a schematic illustration of the cameras 70 and 72 of the stereovision assembly 60. The cameras 70 and 72 may be of any several known types. For example, the cameras may be charge-coupled devices ("CCD") or complementary metal-oxide semiconductor ("CMOS") devices. Preferably, the cameras 70 and 72 take two-dimensional, grayscale images of the passenger compartment of the vehicle 26. In one example embodiment of the present invention, the cameras 70 and 72 are wide spectrum response cameras that cover the visible and near-infrared spectrums.

The cameras 70 and 72 are spaced apart from one another so as to enable the cameras to be used for determining a distance, also called a "range," from the cameras to an object. The object is shown schematically in FIG. 2 and is indicated by reference numeral 94. The distance between the cameras 70 and 72 and the object 94 may be determined by using triangulation. The cameras 70 and 72 have different views of the passenger compartment due to the position of the object 94 relative to each camera 70 and 72 being different. As a result, the object 94 is located at a different position in the image obtained by camera 70 than in the image obtained by camera 72. The difference in the positions of the object 94 in the images is referred to as "disparity." To get a proper disparity between the images for performing triangulation, it is desirable for the cameras 70 and 72 to be positioned so that the object 94 to be monitored is within the horopter of the cameras.

Camera 70 includes a lens 100 and a pixel array 110. Likewise, camera 72 includes a lens 102 and a pixel array 112. Since the cameras 70 and 72 are located at different positions relative to the object 94, an image of the object 94 formed on the pixel array 110 of camera 70 differs from an image of the object 94 formed on the pixel array 112 of camera. 72. The distance between the viewpoints of the cameras 70 and 72, i.e., the distance between the lenses 100 and 102, is designated "b" in FIG. 2. The focal length of the lenses 100 and 102 of the cameras 70 and 72 is designated as "f" in FIG. 2. The lenses 100 and 102 of the cameras 70 and 72 of FIG. 2 have the same focal lengths. The horizontal distance from the image center on the pixel array 110 and the image of the object 94 on the pixel array 110 of camera 70 is designated "dl" in FIG. 2. The horizontal distance from the image center on the pixel array 112 and the image of the object 94 on the pixel array 112 for the camera 72 is designated "dr" in FIG. 2. Preferably, the cameras 70 and 72 are mounted so that they are in the same image plane. The difference between dl and dr is referred to as the "image disparity" and is directly related to the distance, designated "r" in FIG. 2, to the object 94 where the distance r is measured normal to the image plane of cameras 70 and 72 from a location v on the image plane. It will be appreciated that $$r = bf/d, \text{ where } d = dl - dr.\qquad\text{(Equation 1)}$$

From equation 1, the distance r to the object 94 as a function of disparity of the images from cameras 70 and 72 can be determined. It should be appreciated that the distance r is an inverse function of disparity.

Figure 3:
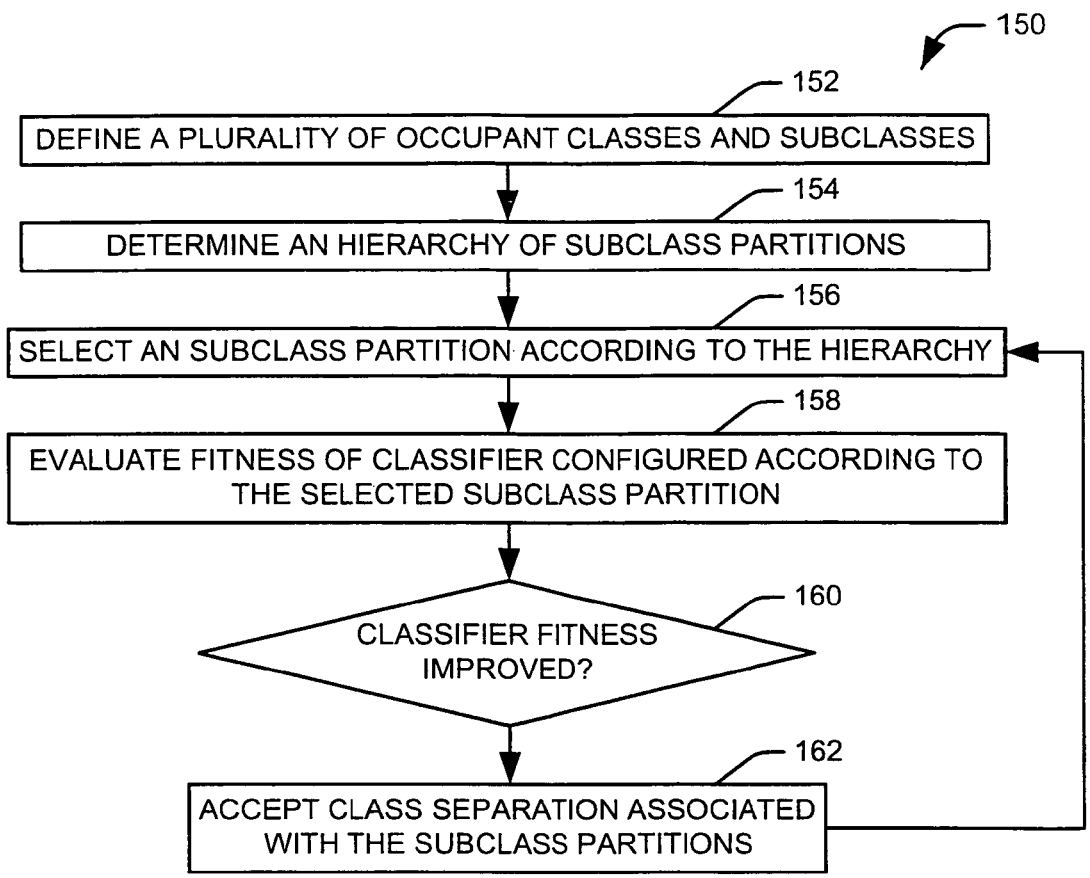
FIG. 3 illustrates a methodology for establishing an architecture for a pattern recognition classifier associated with a vehicle occupant protection system.

FIG. 3 illustrates a methodology 150 for establishing an architecture for a pattern recognition classifier within a vehicle occupant protection system. While, for purposes of simplicity of explanation, the methodology 150 has steps shown and described as executing serially, it is to be understood and appreciated that the present invention is not limited by the illustrated order, as some steps could occur in different orders and/or concurrently with other steps from that shown and described herein.

The methodology 150 begins at step 152, where a plurality of occupant classes and subclasses are defined. The occupant classes represent broad classes of interest to the classification problem. Each occupant class can comprise one or more subclasses. The subclasses can represent specific instances of the occupant classes. In establishing the classifier architecture, the subclasses are partitioned into a plurality of operative classes that are discriminated among by the classifier. Each operative class is associated with one of the plurality of occupant classes and is comprised of one or more subclasses of its associated occupant class.

At step 154, a hierarchy of subclass partitions is established. Beginning with a minimum partition, where the operative classes are equivalent to the occupant classes, a series of immediate partitions are developed by separating one operative class in each successive partition until a maximum partition is reached, where each operative class comprises a single subclass. The class separation added at each partition in the series can be determined to maximize the distance in a feature space associated with the classifier between the two operative classes created by the class separation. Accordingly, while the hierarchy represents a small subset of the possible subclass partitions, the class separations are selected such that the probability of finding an optimal or near optimal partition of the subclasses is very high.

At step 156, a subclass partition is selected according to the hierarchy. For example, in a first iteration, the minimum partition would be selected, in a second iteration, the partition immediate to the medium partition would be selected, and so on until a maximum partition is reached. At step 158, the classifier is configured according to the selected subclass partition and the performance of the classifier is evaluated. For example, the classifier can be trained to distinguish among the operative classes defined by the selected partition and tested on a verification set. The classifier can be evaluated according to its performance on the verification set (e.g., accuracy, rejection rate, etc.).

At step 160, it is determined if the classifier performance has improved between two iterations. If so (Y), the methodology advances to step 162 where the class separation associated with the selected partition is accepted. The methodology then returns to step 156 to select another subclass partition. If the classifier performance has not improved, the class separation associated with the selected partition is not accepted, and the methodology returns to step 156 to select a new partition for evaluation. In one implementation, the class associated with the class separation is accepted as an operative class, such that no partitions requiring further separation of the class are considered. The methodology 150 terminates when all of the subclass partitions have been eliminated or evaluated.

Figure 4:
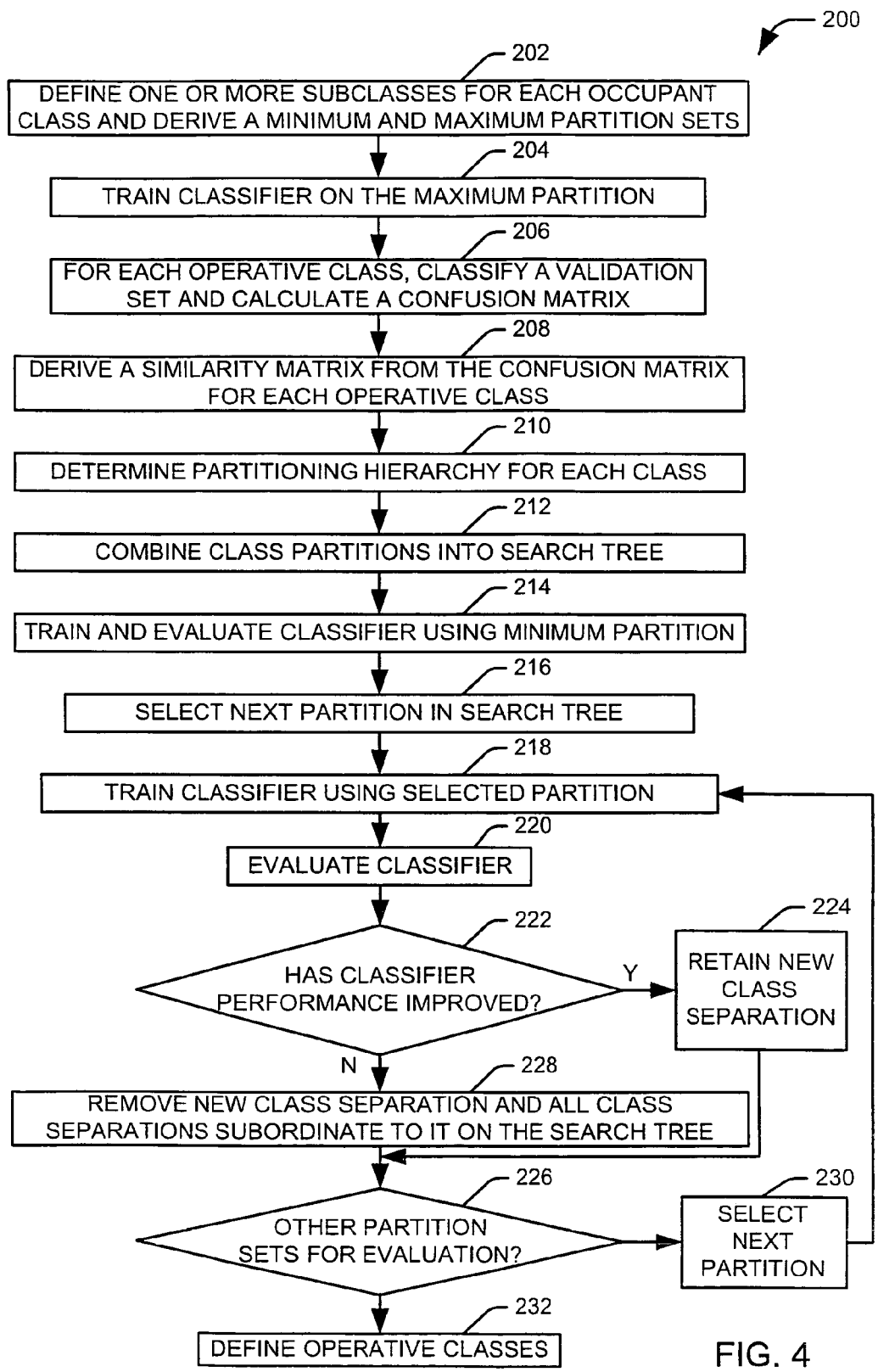
FIG. 4 illustrates an example methodology for establishing an architecture for a pattern recognition classifier associated with a vehicle occupant protection system in accordance with an example implementation of the present invention.

FIG. 4 illustrates an example methodology 200 for establishing an architecture for a pattern recognition classifier for a vehicle occupant protection system in accordance with an example embodiment of the present invention. While, for purposes of simplicity of explanation, the methodology 200 has steps shown and described as executing serially, it is to be understood and appreciated that the present invention is not limited by the illustrated order, as some steps could occur in different orders and/or concurrently with other steps from that shown and described herein.

The methodology 200 begins at step 202 where one or more subclasses are defined for each of a plurality of occupant classes, representing the classes of interest for a particular problem. For example, the occupant classes can include a few broad classes such as an adult class, a small occupant class, and an empty seat class. The subclasses can represent specific instances of the occupant classes. For example, the adult class can be broken down into subclasses associated with the adult's size, such as a first subclass representing an adult at ninety-fifth percentile in height and weight, a second subclass representing an adult at a median (e.g., fiftieth percentile) height and weight, and a third subclass representing an adult at a fifth percentile in height and weight. Similarly, the small occupant class can include subclass representing children in various poses (e.g., standing, kneeling, sitting, leaning forward, lying down, etc.), empty and occupied booster seats, empty and occupied convertible child seats, empty and occupied frontward facing child seats, and empty and occupied rearward facing infant seats. It will be appreciated that other occupant classes and subclasses can be used in accordance with the present invention.

The present invention relates to the partitioning of the plurality of subclasses associated with the occupant classes to produce a plurality of operative classes to be distinguished by a pattern recognition classifier. Each operative class is associated with one of the plurality of occupant classes and comprises at least one subclass of its associated occupant class. A maximum and minimum partition can be defined for a given set of subclasses. In a minimum partition of the subclasses, the operative classes are each equivalent to the occupant classes, such that a given operative class comprises all of the subclasses associated with its occupant class. In a maximum partition, each operative class comprises a single subclass. A number of partitions can be defined between the maximum and minimum partitions.

At step 204, the classifier is trained using an architecture based on the maximum partition. In this architecture, the classifier distinguishes between the plurality of subclasses as operative classes. At step 206, a validation set is classified at the classifier for each occupant class. The results of this analysis are recorded as a confusion matrix. It will be appreciated that the confusion matrix reflects the similarity of the classes in a feature space defined by a plurality of features utilized by the classifier. At step 208, a similarity matrix, reflecting the pair wise similarity among the plurality of subclasses is derived from the confusion matrix for each occupant class. Distance measures can be derived from the values comprising the confusion matrix and utilized to generate the similarity matrix.

At step 210, a subclass partition hierarchy is generated for each occupant class according to the similarity matrix for the class. For example, the search tree can be generated in accordance with a hierarchical agglomerative clustering algorithm. The hierarchical agglomerative clustering algorithm is a bottom-up clustering algorithm in which each subclass is initially represented by a single cluster. In each successive iteration of the algorithm, the closest pair of clusters, according to the similarity criteria, is combined until every subclass is in the same cluster. The order in which the classes are combined can be used to construct a hierarchy of partitions that progresses from a minimum partition of the subclasses (e.g., all subclasses in a single cluster) to a maximum partition (e.g., all subclasses in separate clusters) through a series of class separations, such that each class separation added to a partition produces a new, immediate partition.

At step 212, the partition hierarchies constructed for the plurality of occupant classes are combined into a single search tree, representing a hierarchy of subclass partitions for the plurality of occupant classes. For example, this can be accomplished utilizing the distance values associated with the similarity matrices for each class. Like the individual hierarchies for each occupant class, the search tree progresses from a minimum partition of the subclasses (e.g., all subclasses associated with a given occupant class in a cluster associated with the class) to a maximum partition (e.g., all subclasses in separate clusters) through a series of class separations, such that each class separation added to a partition produces a new, immediate partition. Each partition comprises a plurality of operative classes for a classifier, with each operative class being associated with a given occupant class and comprising a plurality of subclasses associated with the occupant class.

At step 214, a pattern recognition classifier is trained and configured to distinguish between the plurality of operative classes defined by the minimum partition. The classifier is then used to classify a verification set having known class membership, and the performance of the classifier is recorded. For example, the performance of the classifier can be recorded as a fitness metric determined as a function of the accuracy and rejection rate of the classifier. It will be appreciated, however, that the computation of the fitness matrix can be more complex, to penalize certain classifier errors more severely based upon the effects of the classification on the behavior of the vehicle occupant protection system.

At step 216, a next partition is selected from the search tree according to the established hierarchy of subclass partitions. It will be appreciated that consecutive partitions in the search tree are immediate partitions such that a successive partition will comprise the previous partition with one operative class from the previous partition being separated into two operative classes in the new partition. The selection of a new partition can be characterized as the selection of a new class separation that distinguishes the two partitions. At step 218, the performance of the classifier is evaluated. For example, the classifier can be used to classify a verification set having known class membership, and the performance of the classifier can be recorded. In one example implementation, the performance of the classifier can be recorded as a fitness metric determined as a function of the accuracy and rejection rate of the classifier.

At step 222, it is determined if the performance of the classifier has improved. For example, the fitness parameter associated with the previous partition can be compared to the fitness parameter associated with the new partition. If the classifier performance has improved (Y), the methodology advances to step 224 where the class separation associated with the new partition is accepted. The methodology then advances to step 226. If the classifier performance has not improved (N), the class separation associated with the new partition is rejected at step 228. In addition, all partitions having class separations subordinate to the class separation associated with the new partition can be rejected, such that the class affected by the class separation will not be separated in later partitions. A first class separation is subordinate to a second class separation within the search tree when the first class separation would further divide an operative class created by the second class separation. The methodology then advances to step 226.

At step 226, it is determined if additional partitions remain for analysis. If so (Y), a new partition is selected at step 230, and the methodology returns to step 218 to evaluate the selected partition. If all partitions have been eliminated or evaluated (N), the occupant classes are defined according to retained class separations at step 232. The methodology then terminates.

Figure 5:
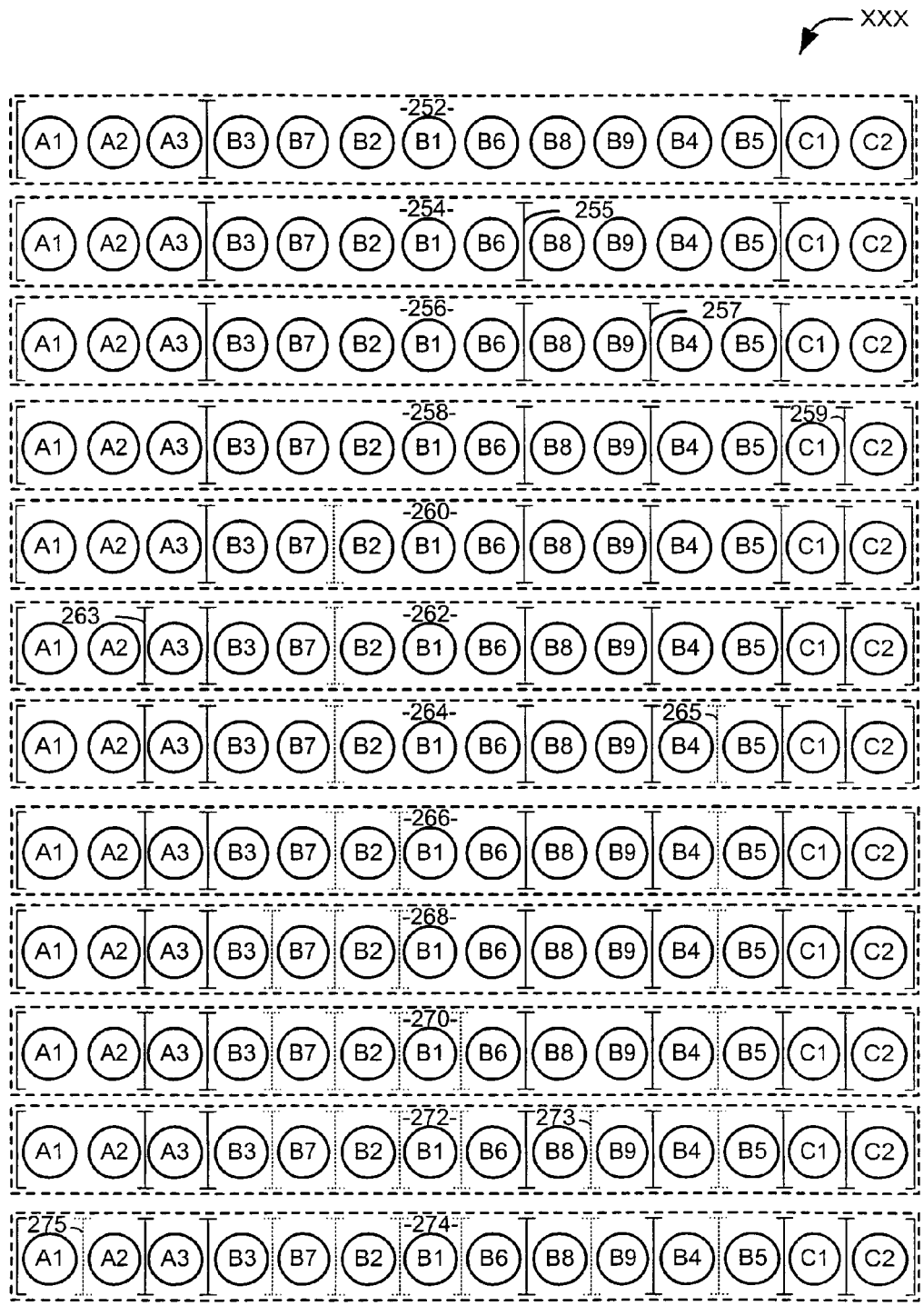
FIG. 5 illustrates a representation of a search tree representing a hierarchy of subclass partitions.

FIG. 5 illustrates a representation of a search tree 250, representing a hierarchy of subclass partitions, A1-A3, B1-B9, and C1-C2, of three occupant classes, A, B, and C for a pattern recognition classifier. The search tree begins at a first, minimum, partition 252, in which the operative classes are equivalent to the occupant classes. It will be appreciated that the performance of the classifier can be evaluated at each of the plurality of partitions in accordance with the present invention.

In a second partition 254, a first class separation 255, is added to divide the existing class comprising B1-B9, into two smaller operative classes. The class separation 255 is determined according to the similarity of the subclass groupings, such that the two new operative classes created by the class separation are separated by a large distance in a feature space associated with the classifier relative to other operative class pairs available through alternative class separations. It will be appreciated that the second partition 254 is immediate to the first partition 252 as they differ by only a single class separation. In the illustrated example, the performance of the classifier is determined to have improved with the addition of the first class separation 255, so the class separation is retained.

In a third partition 256, a second class separation 257 has been added to split the operative class comprising B4, B5, B8, and B9 into two smaller operative classes. The second class separation 257 is selected such that the two new operative classes created by the class separation are separated by the largest possible distance given the existing class separation 255. In the illustration, the performance of the classifier is determined to have improved with the addition of the second class separation 257, so the class separation is retained. In a fourth partition 258, a third class separation 259 has been added to split the operative class comprising C1 and C2 into two operative classes, each comprising a single subclass. In the illustration, the performance of the classifier is determined to have improved with the addition of the third class separation 259, so the class separation is retained. Since the subclasses C1 and C2 cannot be further divided, they can be considered final operative classes for the classifier.

In a fifth partition 260, a fourth class separation 261 has been added to split the operative class comprising B1-B3, B6, and B7 into two smaller operative classes. In the illustration, the performance of the classifier is determined to have failed to improve with the addition of the fourth class separation 261, so the fourth class separation 261 is rejected. To illustrate this, the fourth class separation 261 is shown in dashed lines. This can also be considered as an acceptance of the operative class comprising B1-B3, B6, and B7 as a final operative class for the system. To increase the efficiency of the search, all subordinate class separations to the fourth class separation 261, that is, class separations associated with the operative classes that would have been generated by the fourth class separation 261, can be rejected along with any partitions in the search tree associated with the subordinate class separations. Accordingly, the eighth, ninth, and tenth partitions 266, 268, and 270 in the series can be removed from consideration, and their associated class separations can be rejected.

In a sixth partition 262, a fifth class separation 263 has been added to split the operative class comprising A1-A3 into two smaller operative classes, one comprising A1 and A2, and the other comprising A3. In the illustration, the performance of the classifier is determined to have improved with the addition of the fifth class separation 263, so the fifth class separation 263 is retained. A3 can thus be considered a final operative class for the system, as it cannot be further divided. In a seventh partition 264, a sixth class separation 265 has been added to split the operative class comprising B4 and B5 into two operative classes, each comprising a single subclass. In the illustration, the performance of the classifier is determined to have failed to improve with the addition of the sixth class separation 265, so the sixth class separation 265 is rejected. Accordingly, the operative class comprising B4 and B5 can be considered a final operative class for the classifier.

Since the eighth, ninth, and tenth partitions 266, 268, and 270 have been eliminated from consideration, the search advances to an eleventh partition 272, where a tenth class separation 273 has been added to split the operative class comprising B8 and B9 into two operative classes, each comprising a single subclass. In the illustration, the performance of the classifier is determined to have failed to improve with the addition of the tenth class separation 273, so the tenth class separation 273 is rejected. Accordingly, the operative class comprising B8 and B9 can be considered a final operative class for the classifier.

In a twelfth partition 274, an eleventh class separation 275 has been added to split the operative class comprising A1 and A2 into two operative classes, each comprising a single subclass. In the illustration, the performance of the classifier is determined to have failed to improve with the addition of the eighth class separation 275, so the eighth class separation 275 is rejected. Accordingly, a final partition for the system contains seven operative classes, a first class comprising A1 and A2, a second class comprising B1-B3, B6 and B7, a third class comprising B4 and B5, a fourth class comprising B8 and B9, and three individual subclasses, A3, C1, and C2.

Figure 6:
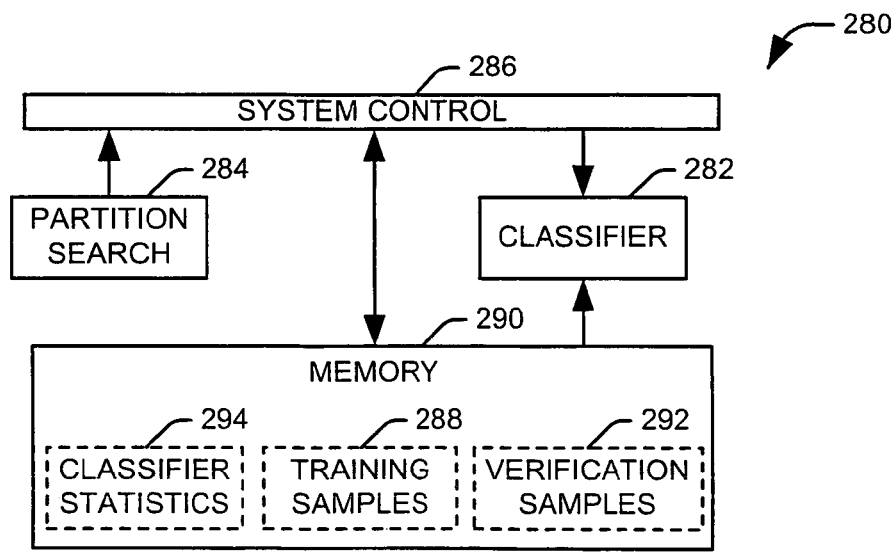
FIG. 6 illustrates an example system for determining an architecture for a pattern recognition classifier.

FIG. 6 illustrates an example system 280 for determining an architecture for a pattern recognition classifier 282 associated with a vehicle occupant protection system. The system 280 selects an architecture comprising a plurality of output classes, referred to as operative classes, with each operative class being associated with one of a plurality of occupant classes for a vehicle occupant protection system. Each occupant class can be broken down into one or more subclasses, with the one or more operative classes representing the occupant class being a partition of the subclasses associated with the occupant class. The pattern recognition classifier 282 can comprise a suitable classification system for assigning an input pattern to one of a plurality of output classes according to one or more features of the input pattern. For example, the pattern recognition classifier 282 can comprise one or more of a support vector machine, a neural network classifier, or a Bayesian statistical classifier.

In accordance with the present invention, a hierarchical search tree can be established at a partition search component 284. In accordance with the present invention, the search tree represents a limited subset of the total number of the partitions available for the plurality of subclasses, but the partitions within the search tree are selected as to be near optimal. This can be accomplished, for example, by determining the similarity of the subclasses within a given occupant class, and determining logical partitions of the subclasses with the occupant class according to the determined similarity. For example, the subclasses can be partitioned such that the search tree begins by separating subclasses and groups of subclasses having the least similarity into different operative classes. By making the most likely class separations early in the search tree, it is possible to search a limited number of the possible partitions of the subclasses with a high probability of discovering an optimal or near optimal partition.

A system control 286 can select a partition from the search tree and configure the classifier 282 to distinguish between a plurality of operative classes defined by the selected partition. A set of training samples 288 can be retrieved from a system memory 290 and used to train the classifier 282 in the selected configuration. For example, the training samples 288 can include a plurality of images from a camera associated with the vehicle occupant protection system and/or a plurality of readings from an array of weight sensors associated with a vehicle seat.

The training of a given classifier will vary with the type of classifier and the selected architecture. For example, a pattern recognition classifier implemented as a support vector machine can process data extracted from the training samples to produce functions representing boundaries in a feature space defined by various features of interest. The bounded region for each class defines a range of feature values associated with each of the plurality of classes. The location of a feature vector representing an input sample with respect to these boundaries can be used to determine the class membership of the input sample and the associated confidence value.

Alternatively, a pattern recognition classifier implemented as an artificial neural network comprises a plurality of nodes having a plurality of interconnections. Each of the plurality of interconnections has an associated weight that can be applied to numerical data passed from node to node along the interconnection. Feature vectors associated with the training samples are provided to the system along with their associated class to adjust the weights associated with the interconnections to appropriate values for distinguishing among the plurality of output classes.

A plurality of verification samples 292 can be retrieved from memory 290 and classified at the classifier 282. Like the training samples 288, the verification samples 292 can include images from a camera mounted in the vehicle, sensor readings from a vehicle seat, or any other sensor data useful for classifying a vehicle occupant. The performance of the classifier can be quantified as one or more fitness parameters and stored in memory 290 as a part of a set of classifier statistics 294. The system control 286 can select the partitions such that each successive partition is an immediate partition of the previous partition. Accordingly, each successive partition defines a new occupant class relative to the previous partition via a new class separation. The system control can determine if the performance of the classifier 282 improves between successive partitions.

When the classifier performance improves, the new class separation can be retained, and further partitions containing the partition can be considered. Where the performance of the classifier 282 does not improve between partitions, the class separation can be discarded, and all partitions having class separations subordinate to that class separation can be eliminated from consideration. This can be continued until all of the partitions represented by the search tree have been evaluated or eliminated. Accordingly, the partitions represented by the search tree can be quickly searched to determine an optimal architecture for the classifier 282.

Figure 7:
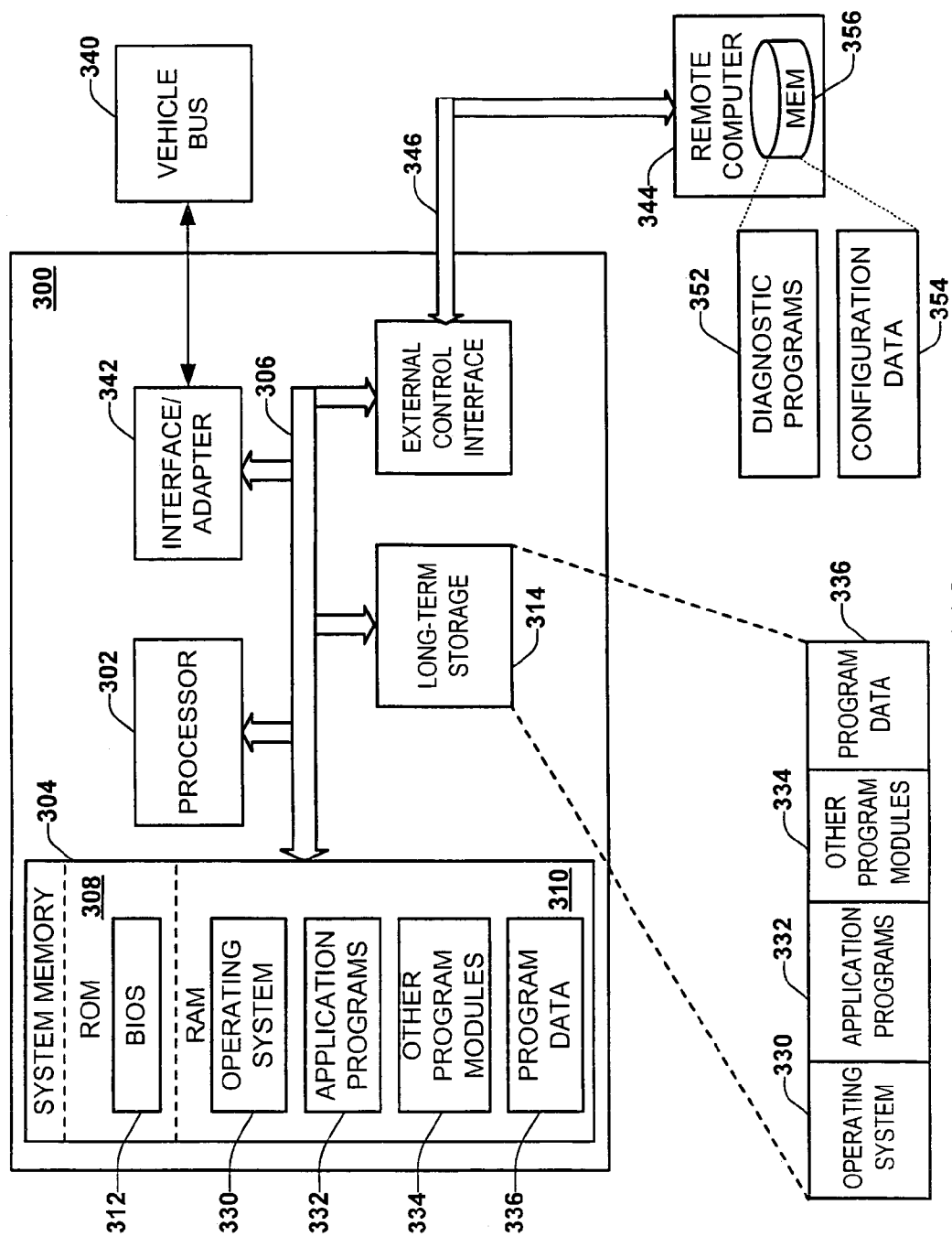
FIG. 7 illustrates a computer system that can be employed to implement systems and methods described herein.

FIG. 7 illustrates a data processing system 300 that can be incorporated into a vehicle to implement systems and methods described herein, such as based on computer executable instructions running on the data processing system. The data processing system 300 can be implemented as one or more general purpose networked computer systems, embedded computer systems, routers, switches, server devices, client devices, various intermediate devices/nodes and/or stand alone computer systems. Additionally, the data processing system 300 can be implemented as part of the computer-aided engineering (CAE) tool running computer executable instructions to perform a method as described herein.

The data processing system 300 includes a processor 302 and a system memory 304. A system bus 306 couples various system components, including a coupling of the system memory 304 to the processor 302. Dual microprocessors and other multi-processor architectures can also be utilized as the processor 302. The system bus 306 can be implemented as any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) 312 can reside in the ROM 308, generally containing the basic routines that help to transfer information between elements within the computer system 300, such as a reset or power-up.

The computer system 300 can include long term storage 314, for example, a magnetic hard disk, an optical drive, magnetic cassettes, or one or more flash memory cards. The long term storage 314 can contain computer executable instructions for implementing systems and methods described herein. A number of program modules may also be stored in the long term storage as well as in the RAM 310, including an operating system 330, one or more application programs 332, other program modules 334, and program data 336.

The data processing system 300 can be connected to a vehicle bus 340 via an interface or adapter 342 to communicate with one or more vehicle systems. Additionally, the data processing system 300 can be connected to a remote computer 344 via a logical connection 346 for configuration or for diagnostic purposes through an external control interface 348. The remote computer 344 may be a workstation, a computer system, a router, a peer device or other common network node, and typically includes many or all of the elements described relative to the computer system 300. Diagnostic programs 352 and configuration data 354 may be stored in memory 356 of the remote computer 344.

From the above description of the invention, those skilled in the art will perceive improvements, changes, and modifications. Such improvements, changes, and modifications within the skill of the art are intended to be covered by the appended claims.

The invention claimed is:

1. A computer implemented method for constructing a classification architecture for a pattern recognition classifier that determines an associated occupant class of an occupant within a vehicle comprising:
   defining a plurality of occupant classes, at least one of the occupant classes having an associated set of subclasses;
   determining a hierarchy of subclass partitions, based on a degree of similarity between subclasses associated with a given occupant class, where each successive partition in the hierarchy is an immediate partition of the preceding partition;
   performing the following steps iteratively until a termination event occurs:
   selecting a subclass partition according to the determined hierarchy;
   evaluating the fitness of a classifier model having an architecture derived from the selected subclass partition; and
   retaining a class separation associated with the selected subclass partition when the evaluated fitness is better than that associated with the preceding subclass partition in the hierarchy;
   training the pattern recognition classifier using a final subclass partition retained at the termination event, such that a plurality of operative classes associated with the pattern recognition classifier are defined by the final subclass partition; and
   controlling deployment of an occupant restraint system with the trained classifier.

2. The method of claim 1, wherein the iteratively performed steps further comprise the step of eliminating the class separation associated with the selected subclass partition as well as any class separations subordinate to the class separation associated with the selected subclass partition when the evaluated fitness is not better than that of the preceding subclass partition in the hierarchy.

3. The method of claim 2, wherein the termination event comprises the elimination of all class separations that have not been evaluated.

4. The method of claim 1, wherein the step of determining a hierarchy of subclass partitions comprises the steps of:
   determining a minimum partition, comprising the occupant classes, and a maximum partition, comprising a plurality of subclasses associated with the occupant classes;
   training a classifier having an architecture derived from the maximum partition of the classes;
   classifying a verification set at the classifier; and
   generating a confusion matrix for each occupant class according to the classification of the verification set.

5. The method of claim 4, wherein the step of determining a hierarchy of subclass partitions further comprises:
   generating a similarity matrix for each occupant class from the confusion matrix generated for the occupant class;
   determining a hierarchy of class separations for each occupant class; and
   constructing a search tree, reflecting the hierarchy of class partitions, from the determined hierarchies of class separations for the occupant classes.

6. The method of claim 1, wherein the plurality of classes comprise an adult occupant class, a small occupant class, and an empty seat class.

7. The method of claim 6, wherein a set of subclasses associated with the small occupant class include at least one child subclass and at least one child seat subclass.

8. The method of claim 6, wherein a set of subclasses associated with the adult occupant class includes a first subclass representing an adult in the ninety-fifth percentile of one of height and weight, a second subclass representing an adult in the fiftieth percentile of one of height and weight, and a third subclass representing an adult in the fifth percentile in one of height and weight.

9. The method of claim 1, wherein the step of evaluating the fitness of a classifier model comprises the steps of:
   training a classifier having an architecture derived from the maximum partition of the classes;
   classifying a verification set at the classifier; and
   evaluating the performance of the classifier on the verification set.

10. A computer program product, operative in a data processing system and implemented on a computer readable medium, for establishing a classification architecture, comprising a plurality of operative classes, to distinguish between a plurality of occupant classes comprising:
    a partition search component that determines a hierarchy of subclass partitions, based on a degree of similarity between subclasses associated with the plurality of occupant classes; and
    a system control that iteratively selects a subclass partition according to the determined hierarchy, evaluates the fitness of a pattern recognition classifier having an architecture derived from the selected subclass partition, and retains a class separation associated with the selected subclass partition when the evaluated fitness is better than that associated with a preceding subclass partition in the hierarchy, a final subclass partition selected at the system control being used to train the pattern recognition classifier to distinguish among a plurality of operative subclasses defined by the subclass partition as to control deployment an occupant protection system.

11. The computer program product of claim 10, wherein the pattern recognition classifier comprises an artificial neural network.

12. The computer program product of claim 10, wherein the pattern recognition classifier comprises a support vector machine.

13. The computer program product of claim 10, wherein the partition search component is operative to generate a confusion matrix for each occupant class using a maximum subclass partition, the confusion matrices representing the plurality of occupant classes being utilized to determine a hierarchy of subclass partitions.

14. The computer program product of claim 13, wherein the partition search component is operative to generate a similarity matrix for each occupant class from the confusion matrix generated for the occupant class, determine a hierarchy of class separations for each occupant class from distance values associated with the similarity matrix associated with the class, and construct a search tree, reflecting the hierarchy of class partitions, from the determined hierarchies of class separations for the occupant classes.

15. A system for establishing a classification architecture, comprising a plurality of operative classes, for a pattern recognition classifier operative to distinguish among a plurality of occupant classes as part of a vehicle occupant protection system, comprising:

a processor;

a partition search component that determines a hierarchy of subclass partitions, based on a degree of similarity between subclasses associated with the plurality of occupant classes; and a system control that iteratively selects a subclass partition according to the determined hierarchy, evaluates the fitness of a pattern recognition classifier having an architecture derived from the selected subclass partition, and retains a class separation associated with the selected subclass partition when the evaluated fitness is better than that associated with a preceding subclass partition in the hierarchy, a final subclass partition selected at the system control being used to train the pattern recognition classifier to distinguish among a plurality of operative subclasses defined by the subclass partition as to control deployment an occupant protection system.

16. The system of claim 15, where the system control is operative to eliminate the class separation associated with the selected subclass partition as well as any class separations subordinate to the class separation associated with the selected subclass partition when the evaluated fitness is not better than that of the preceding subclass partition in the hierarchy.

17. The system of claim 15, further comprising a system memory that contains a set of training samples and a set of verification samples for the pattern recognition classifier, the system control being operative to train the pattern recognition classifier on the set of training samples, instruct the classifier to classify the set of verification samples, and evaluate the performance of the classifier on the verification set.

18. The system of claim 17, wherein the set of training samples comprises at least one of a plurality of images from a camera associated with the vehicle occupant protection system and a plurality of readings from an array of weight sensors associated with a vehicle seat.

19. The system of claim 15, wherein the hierarchy of subclass partitions proceeds from a minimum partition of the subclasses, in which each of the plurality of operative classes corresponds to an occupant class, through a series of immediate partitions to a maximum partition, in which each of the plurality of operative classes corresponds to one of a plurality of subclasses associated with the plurality of occupant classes.

* * * * *